United States Patent [19]
Juso et al.

[11] Patent Number: 5,249,065
[45] Date of Patent: Sep. 28, 1993

[54] STILL PICTURE RECORDING APPARATUS

[75] Inventors: Hiromi Juso, Gose; Yukihiko Haikawa, Higashi-Hiroshima, both of Japan

[73] Assignee: Sharp Kabushiki Kaisha, Osaka, Japan

[21] Appl. No.: 392,308

[22] Filed: Aug. 11, 1989

[30] Foreign Application Priority Data

Aug. 12, 1988 [JP] Japan .................. 63-202414

[51] Int. Cl.$^5$ .................. H04N 5/76; H04N 5/782
[52] U.S. Cl. .................. 358/335; 300/35.1
[58] Field of Search .................. 358/335, 906, 909, 311, 358/105, 108, 136; 360/37.1, 35.1, 33.1, 14.1, 11.1

[56] References Cited

U.S. PATENT DOCUMENTS

| | | | |
|---|---|---|---|
| 4,131,919 | 12/1978 | Lloyd et al. | 358/906 |
| 4,272,787 | 6/1981 | Michael et al. | 358/160 |
| 4,403,250 | 9/1993 | Kellar | 358/105 |
| 4,476,996 | 5/1988 | Furuhata et al. | 360/36.2 |
| 4,691,230 | 9/1987 | Kaneko et al. | 358/105 |
| 4,780,756 | 10/1988 | Shiota et al. | 358/140 |
| 4,858,029 | 8/1989 | Ookawa | 358/340 |
| 4,920,423 | 4/1990 | Shiota | 358/335 |
| 4,924,311 | 5/1990 | Ohki et al. | 358/138 |

FOREIGN PATENT DOCUMENTS

| | | |
|---|---|---|
| 2158983 | 6/1973 | Fed. Rep. of Germany . |
| 2710781 | 9/1978 | Fed. Rep. of Germany . |
| 63-102576 | 5/1988 | Japan . |
| 63-181578 | 7/1988 | Japan . |

Primary Examiner—Howard W. Britton
Assistant Examiner—Huy Nguyen
Attorney, Agent, or Firm—Birch, Stewart, Kolasch & Birch

[57] ABSTRACT

The invention relates to a still picture recording apparatus for selecting and recording a desired screen of analog video signal as a still picture. The apparatus of the invention includes a still picture memory for storing digital signals for at least one screen, a delay memory for delaying a screen stored in the still picture memory by a time of a portion of one or plural screens, a change detecting circuit for detecting change in the screen by comparing the stored contents of the still picture memory and the delay memory and for detecting a large change in the screen, and a recording apparatus for recording the stored content of the still picture memory onto a recording medium, such as magnetic tape, when the screen is changed by a large amount, in response to the output of the screen change detecting circuit.

17 Claims, 3 Drawing Sheets

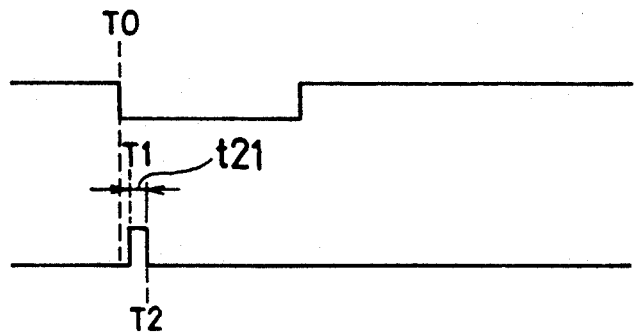
FIG. 2(1) g PRIOR ART
FIG. 2(2) d21 PRIOR ART
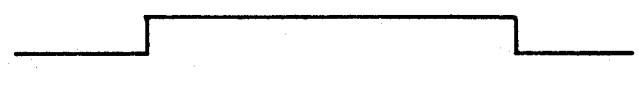
FIG. 2(3) d22 PRIOR ART
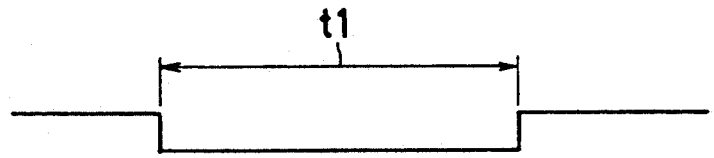
FIG. 4(1) P0
FIG. 4(2) P1
FIG. 4(3) P2
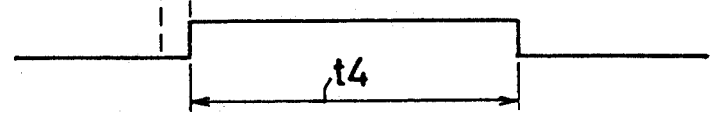

STILL PICTURE RECORDING APPARATUS

BACKGROUND OF THE INVENTION

1. Field of the Invention

The present invention relates to a still picture recording apparatus for recording a desired picture from video signals as a still picture.

2. Description of the Background Art

The recent advancement in digital technology is remarkable also in the video field, and it is now possible to record and process a video signal, which is an analog quantity, without lowering its quality by digitizing it.

One of such examples is the so-called digital still video tape recorder, which is a still picture recording apparatus for recording the video data of one screen of a television receiver as a still picture, in a magnetic tape which is a recording medium differing in transmission rate.

In the case that the recording frequency of the recording medium used in the still picture recording apparatus is lower than the carrier frequency of the video signal, the video signal is analog-to-digital converted (A/D converted), and the signal is once stored in means for storing, such as a memory, and then it is transmitted and recorded in this apparatus at a lower transmission rate.

Let us then suppose to record NTSC video signals (hereinafter referred to merely as video signals) in a magnetic tape by using a digital audio tape recorder (DAT apparatus). The time per screen of a video signal is 1/60 second, and assuming the number of quantitized bits for A/D converting the video signal to be 8, and the sampling frequency to be four times the video subcarrier frequency (fsc=3.58 MHz), that is, 4 fsc=14.32 MHz, the number of data bits per screen is calculated as follows.

$$1/60 \times 8 \times 14.32 \times 10^6 = 1.911 \text{ megabits} \quad (1)$$

On the other hand, the DAT apparatus deals with ordinary audio signals, and supposing the number of quantitized bits to be 16, the sampling frequency to be 48 kHz, and the number of channels to be 2, the number of bits that can be recorded in one second is obtained as follows.

$$16 \times 48 \times 10^3 \times 2 = 1.536 \text{ megabits/second} \quad (2)$$

Therefore, the time required for recording one still picture on a magnetic tape by using the DAT apparatus is $$1.911/1.536 = 1.244 \text{ seconds} \quad (3)$$

Hence, to record one still picture by DAT, the video data cannot be taken in unless an interval of 1.244 seconds or more is provided.

FIG. 1 is a block diagram of a conventional still picture recording apparatus 21. The still picture recording apparatus 21 is intended to record the video information for one screen from video signal V onto a magnetic recording paper (hereinafter called tape) 26, and it comprises, among others, an A/D converter 22 for converting video signal V into a digital signal, a still picture memory 23 for storing digital data for the portion of one screen, and a recording signal processing circuit 24 for reading out the stored data at the transmission rate of DAT, processing it by parity addition, modulation or the like, and recording it onto the tape 26 through a recording head 25.

A gate pulse generator 27 individually generates, when an operation switch 28 is pressed, a first gate pulse signal d21 and a second gate pulse signal d22 to a video system clock signal generator 30 and a tape system clock signal generator 31 at the timing of the vertical synchronizing signal Sv obtained from the video signal V through a synchronous separating circuit 29.

The video system clock signal generator 30 generates a control clock signal cka used at the time of writing into the A/D converter 22 and still picture memory 23. The tape system clock signal generator 31 generates a control clock signal ckb at the time of writing into the still picture memory 23 and recording signal processing circuit 24.

FIG. 2 is a time chart showing the operation of the conventional still picture recording apparatus 21 shown in FIG. 1. In FIG. 2, the parts corresponding to those in FIG. 1 are identified with the same reference codes.

When the operation switch 28 is pressed, the potential of a trigger terminal g of the gate pulse generator 27 becomes zero at time T0 as shown in FIG. 2 (1), and at the immediately succeeding timing of vertical synchronizing signal Sv, a first gate pulse signal d21 with time width t21 corresponding to the portion of one screen from time T1 is delivered as shown in FIG. 2 (2). This time width t21 is 1/60 second, and for this period, the video system clock signal generator 27 operates, and the video data for one screen converted digitally is taken into the still picture memory 23.

At time T2 when the level of the first gate pulse signal d21 becomes zero, a second gate pulse signal d22 shown in FIG. 2 (3) is delivered for the period of 1.244 seconds as shown in formula (3), and the tape system clock signal generator 28 is actuated, and the data of one screen portion stored in the still picture memory 23 is read out and recorded in the tape 26. That is, at the time of pressing of an operation switch 28, a still picture is selected from the video signal V, and is recorded in the tape 26.

However, in the still picture recording apparatus of the prior art, since pressing of the operation switch 28 is needed for recording, a person (an operator) must always monitor the screen, and press the operation switch 28 every time the desired picture appears. To be liberated from such obligation, it has been proposed to record the still picture automatically by applying a pulse signal of a specific period instead of as a result of operation of switch 30. However, this results in the problem of failure to record a picture truly desired to be recorded while recording the still picture.

SUMMARY OF THE INVENTION

It is hence a primary object of the invention to solve the above technical problems, and to present a still picture recording apparatus capable of recording a desired picture from a video signal without requiring manual operation.

To achieve the above object, the invention presents a still picture recording apparatus which comprises:

an analog/digital converter circuit for converting a video signal into a digital signal, a still picture memory responsive to the output from the analog/digital converter circuit for storing digital signals for at least one screen, a delay memory for receiving and storing the same output from the analog/digital converter stored in the still picture memory, and for delaying the stored digital signals by the time of one or plural screens than the screen stored in the still picture memory, a detecting circuit for detecting change in a screen by comparing the outputs of every corresponding bit of digital signals of a still picture stored in the still picture memory and delayed stored digital signals of the delay memory, and for detecting a large change of the screen, and a recorder, having a recording medium, which in response to the screen change detecting circuit, records the stored content in the still picture memory onto the recording medium.

In a preferred embodiment, the screen change detecting circuit comprises:

a subtraction circuit for determining the difference by subtracting the corresponding bits of the digital signals of the still picture stored in the still picture memory and the delayed stored digital signals, of the delay memory, an absolute value circuit for determining the absolute value of the difference obtained by the subtraction circuit, and an accumulator for accumulating the outputs from the absolute value circuit for determining the absolute value at every bit, for discriminating the level of the cumulative value of one screen at a predetermined value, and for leading out stored digital signals expressing a large change in the screen when the cumulative value of one screen is over the predetermined value.

In another preferred embodiment, the digital signal of one screen is the digital signal of a pair of fields.

In a different preferred embodiment, the digital signal of one screen is the digital signal of a single field.

In a further different preferred embodiment, the storing operation of the still picture memory and the storing operation of the delay memory are achieved by using a vertical synchronizing signal contained in the video signal.

In a still different preferred embodiment, the recorder records onto a recording medium which comprises a magnetic tape, and is designed to record the stored content of the still picture memory onto the magnetic tape by a digital audio tape system.

The invention also presents a still picture recording apparatus capable of selecting a desired screen out of video signals being fed continuously, storing the video data of the screen as still picture data, and leading out the video data as video signals onto a recording medium to be recorded, which comprises:

an analog/digital converter for converting the video signal into digital data, a memory for storing the digital data as still picture data, a detector for detecting change in still picture data of a screen and which detects a large change over plural screens of the continuously fed video signals, a controller responsive to the output from the screen change detector for controlling the timing for controlling writing/reading into the memory at a predetermined timing, and a processor for processing the still picture data read out from the memory, and for treating and leading out the stored video data as video signals.

The still picture recording apparatus of the invention is capable of detecting a large change in the video data of a screen using the screen change detector before and after continuously fed video signals are delivered.

By this detection output, the action of the analog/digital converter for converting the video data of the portion of one screen of the video signals into digital data, and the timing of writing/reading of the memory for storing the digital data are controlled.

Accordingly, the desired picture is selected from the moving video signals, and the still picture data of the screen is obtained, and is led out onto the recording medium or the like.

Thus, the still picture recording apparatus of the invention detects a large change in the image, and stores the video data for the portion of one screen of the video signals as still picture data in accordance with this detection. The apparatus thereafter reads out and records, at a predetermined timing corresponding to the transmission rate of the recording medium, the video data of the one screen. As a result, manual operation is not needed, and only important and desired screens can be automatically #recorded.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects of the invention, as well as the features and advantages thereof, will be better understood and appreciated from the following detailed description taken in conjunction with the accompanying drawings, which are given by way of illustration only, and thus are not limitative of the present invention and wherein.

DETAILED DESCRIPTION OF THE PREFERRED EMBODIMENT

Figure 1:
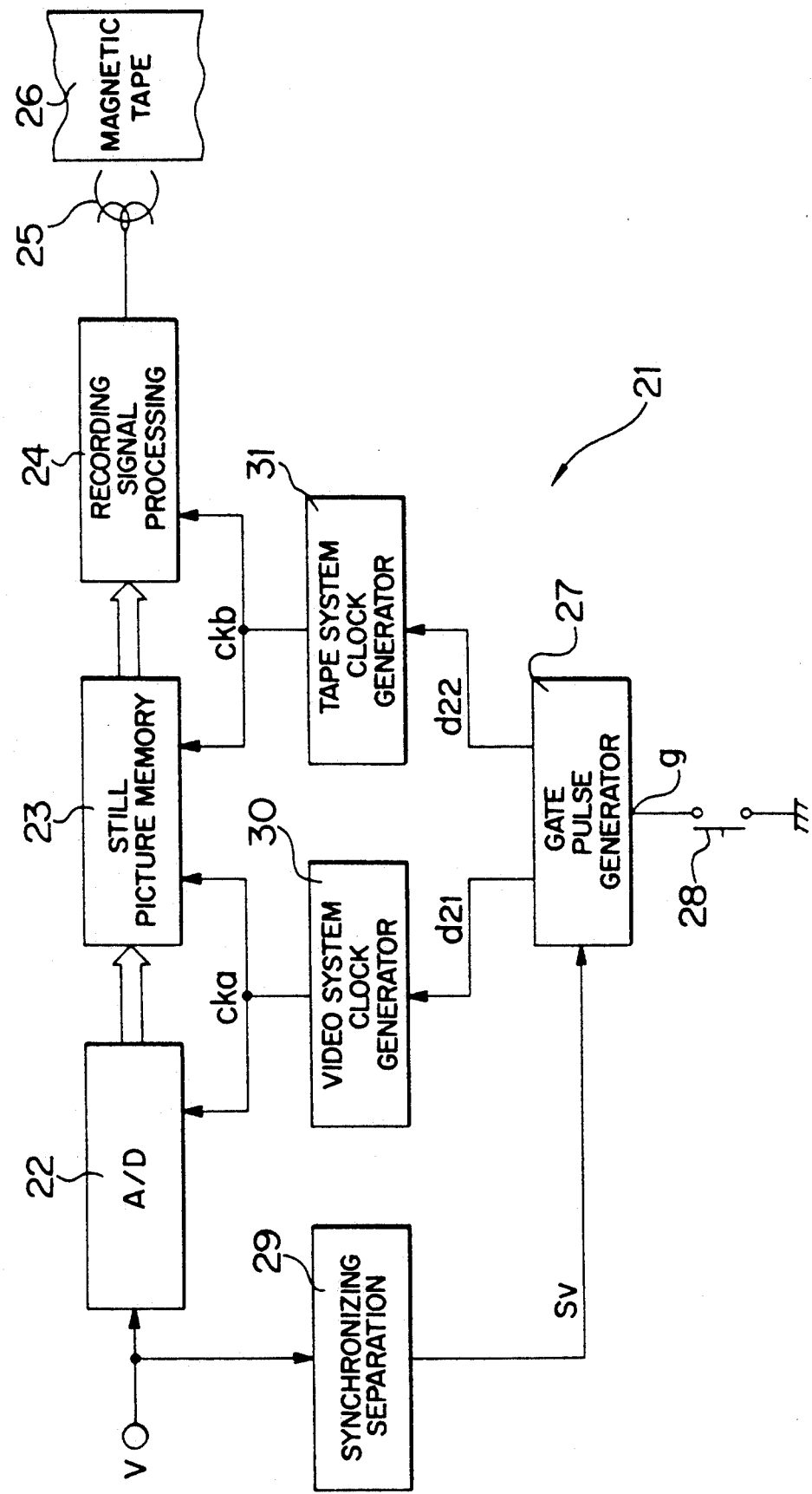
FIG. 1 is a block diagram showing an electrical construction of a conventional still picture recording apparatus, FIG. 2 (1) to (3) are timing charts for explaining the operation of the conventional still picture recording apparatus.

Referring now to the drawings, one of the preferred embodiments of the invention is described in detail below.

Generally, the screen desired to be recorded as a still picture is mostly a picture different from the previous scene, such as a so-called cut scene. Taking notice of this point, the invention is intended to create first video data without time delay, as corresponding to the video data after digital conversion, and second video data with a time delay corresponding to, for example, one screen. The apparatus detects a large change in the screen by comparing these two, selects the screen at this changing timing for recording, and records the still picture efficiently.

Figure 3:
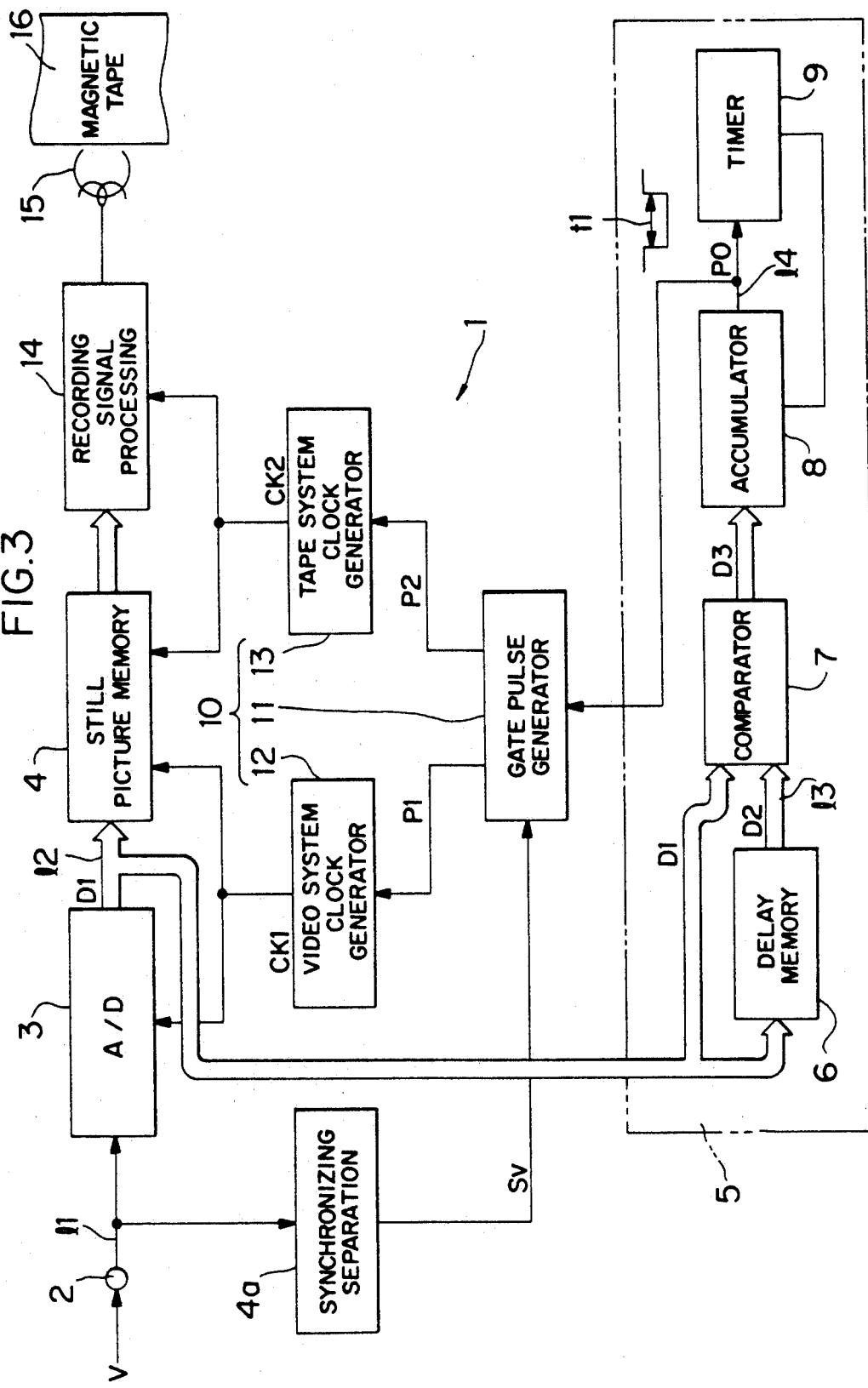
FIG. 3 is a block diagram showing an electrical construction of a still picture recording apparatus according to one of the embodiments of the invention, and FIG. 4 (1) to (3) are timing charts showing the operation of the same embodiment.

FIG. 3 is a block diagram showing construction of a still picture recording apparatus 1 of one of the embodiments of the invention. The video signal V, which is a continuously fed picture signal, is fed into an analog/digital (A/D) converter 3 for converting video signal V into digital data, and is also fed to a synchronizing signal separating circuit 4a, from an input terminal 2 by way of line 11. The synchronizing signal separating circuit 4a separates a vertical synchronizing signal corresponding to the time corresponding to the portion of one screen from the video signal V, and feeds it into a gate pulse generator 11 which is described later.

The A/D converter 3 converts the video signal V into digital data, and creates first video data D1, and feeds it into a still picture memory 4 which stores the video data, and a screen change detecting circuit 5, through a line 12. The still picture memory 4 is realized by a high speed access memory, for example, a dynamic RAM, which processes a memory capacity corresponding to 1.911 megabits expressed in equation (1).

The screen change detecting circuit 5 has a delay memory 6, a comparator 7, an accumulator 8 and a timer circuit 9, and the first digital signal D1 led out into the line 12 is fed into the delay memory 6 and a first input of the comparator 7. The delay memory 6 holds the first video data for the time corresponding to one picture, and delivers second video data D2 delayed for the portion of one screen from the first video data D1. The delay memory 6 realized by, similar to the still picture memory 4, a high speed access memory such as a dynamic RAM.

The second video data D2 delayed for the portion of one screen by the delay memory 6 is fed into the other input of the comparator 7 through line 13. The comparator 7 is composed of a subtraction circuit and a circuit for determining the absolute value of the output from the subtraction circuit, both of which are not shown, and compares the magnitude of the values of the first video data D1 and the second digital signal D2 delayed by one screen, at every bit, and when the difference is larger, a larger value (that is, the absolute value of the difference) is fed into the accumulator 8 as the comparison data signal D3, or 0 is fed likewise when both signals are equal.

The accumulator 8 sums up sequentially the comparison data signal D3 by portions of every screen, and when the sum exceeds a predetermined value, it delivers a trigger pulse signal P0 of level 0 to line 14. At the same time, the timer 9 is actuated to hold the time width t1 of the trigger pulse signal P0 for the maximum time of 1.277 seconds. This time of 1.277 seconds is, as described later, the sum of the time of 1.244 seconds expressed in equation (2) and the time of 0.033 (=1/30) second corresponding to the portion of two fields. By the trigger pulse signal P0, which is the output of the screen change detecting circuit 5, the timing control apparatus 10 for controlling the timing of writing/reading into the still picture memory 4 is actuated.

The timing control apparatus 10 is composed of gate pulse generator 11, video system clock signal generator 12, and tape system clock signal generator 13. The video system clock signal generator 12 activates the A/D converter 3 and still picture memory 4, which then takes in the video signal for the portion of one screen from the video signal V, converts it digitally and delivers it to the still picture memory 4 in synchronism with a first control clock signal ck1 for storing the video signal as still picture data.

The tape system clock signal generator 13 directs read out of the still picture data for the portion of one screen stored in the still picture memory 4. The recording signal processing circuit then processes and treats the still picture data. The tape system clock generator 13 delivers a second control clock signal ck2 for activating the signal processing means 14 to direct leading out of the video signals. Referring to FIG. 4, the operation of this embodiment is described hereinafter.

FIG. 4 (1)-(3) are timing charts for explaining the operation of this embodiment, and the same reference codes are attached to the parts corresponding to those in FIG. 3. Referring simultaneously to FIG. 3, when a large change in sequential screens of a specific video signal V is detected by the screen change detecting means 5, the trigger pulse signal P0 with time width t1 shown in FIG. 4 (1) is delivered from the accumulator 8, and is applied to the gate pulse generator 11. On the other hand, since a vertical synchronizing signal Sv is applied to the gate pulse generator 11, the gate pulse generator 11 calculates the AND of the trigger pulse signal P0 and the vertical synchronizing signal Sv, and delivers a first gate pulse signal P1 with time width t3 as shown in FIG. 4 (2), corresponding to the first one screen portion after the trigger pulse signal P0 becomes 0. The time width t3 of the first gate pulse signal P1 is 1/60 second.

The time t2 between the fall of the trigger pulse signal P0 in FIG. 4 (1) and the rise of the first gate pulse signal P1 in FIG. 4 (1) is the time corresponding to the portion of one field of the screen at maximum, produced at the timing of the vertical synchronizing signal Sv, being expressed as follows.

$$t2 + t3 \leq 0.033 \ (=1/30) \text{ second} \qquad (4)$$

It is because of this reason that the time width t1 of the trigger pulse signal P0 is set at the maximum of 1.277 seconds by adding 0.033 second to 1.244 seconds.

During the time t3 of output of the first gate pulse signal P1, the video system clock signal generator 12 is actuated, and the image data corresponding to 1/60 second, that is, one screen is written into the still picture memory 4, and is stored as still picture data.

After time t3, when the first gate pulse signal P1 becomes zero, a second gate pulse signal P2 corresponding to the tape system clock signal generator 13, of time width t4 shown in FIG. 4 (3) which is 1.244 seconds, is delivered and the tape system clock signal generator 13 is actuated for this period, and by the second control clock signal ck2 delivered correspondingly, the still picture data stored in the still picture memory 4 is read out, for example, at the transmission rate of DAT, and is fed into recording signal processing means 14. The picture data is then subjected to signal processing necessary for recording, such as parity addition and modulation, and is recorded on the magnetic recording tape 16 through the recording head 15 for the time width of 1.244 seconds.

Thus, in this embodiment, a specific change of a picture over a specified value is detected, and the specific picture is automatically recorded at that timing, and therefore manual operation is not needed. Accordingly, and only the important and desired picture can be recorded.

In this embodiment, the still picture is recorded on the magnetic tape 16, but the recording medium is not limited to the magnetic tape alone, but, for example, a compact disc, floppy disc or other disc recording medium may be equally used. Furthermore, the still picture after signal processing by the recording signal processing circuit 14 in FIG. 3, may be led out and transmitted through, for example, a public telephone line.

In the foregoing embodiment, the delay memory 6 and still picture memory 4 are shown to have identical capacities, but the delay memory 6 does not require a capacity as that of much as the still picture memory 4 because it is used for detecting the change in the screen, and therefore the delay memory 6 may be designed to store every predetermined number of pixels or picture elements by thinning out the bits or pixels for composing one screen. At this time, the difference of the information of pixels stored in the delay memory 6 and the information of pixels in the still picture memory 4 corresponding to each pixel may be obtained by comparing. As a result, the cost of component parts may be reduced.

In this embodiment, meanwhile, digital data comprising two fields as one screen is stored in the still picture memory 4, but as another embodiment of the invention, it may be desired to store digital data for the portion of one frame in the still picture memory 4. Moreover, the delay memory 6 may be designed to delay the time for the portion of one screen or plural screens than the screen stored in the still picture memory 4, for example, by the time for the portion of one field or two fields.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A still picture recording apparatus comprising:
analog/digital converter means for converting input video signals into digital video signals;
still picture memory means, coupled to said analog/digital converter means, for storing the digital video signals of at least one screen;
delay memory means, coupled to said analog/digital converter, for delaying the digital video signals by a time of at least one screen with respect to the digital video signals of the corresponding at least one screen stored in said still picture memory means;
screen change detecting means for detecting change in the digital video signals of sequential screens by comparing every corresponding bit of the digital video signals of a screen output from said analog/digital converter means and the delayed digital video signals of a screen output from said delay memory means, and for outputting a detection signal upon detecting a change in the digital video signals of the sequential screens which is greater than a predetermined value, said screen change detecting means including timer means for generating a pulse signal of predetermined duration as said detection signal; and
recording means, coupled to said screen change detecting means, for recording the digital video signals stored in said still picture memory means onto a recording medium upon receipt of said detection signal.

2. The still picture recording apparatus according to claim 1, wherein said screen change detecting means comprises:

subtraction means for determining a difference between the digital video signals of sequential screens by subtracting the corresponding bits of the digital video signals output from said analog/digital converter means and the delayed digital video signals output from said delay memory means;
absolute value detecting means for determining and outputting an absolute value of the difference obtained by said subtraction means; and
accumulator means, for accumulating the absolute value outputs from said absolute value detecting means for every bit, for discriminating a level of a cumulative value of one screen of the absolute value outputs with respect to said predetermined value, and for outputting a signal indicative of a change in the digital video signals of a screen when the cumulative value of one screen is greater than said predetermined value.

3. The still picture recording apparatus according to claim 1, wherein the digital video signals of one screen comprises the digital video signals of a pair of fields.

4. The still picture recording apparatus according to claim 1, wherein the digital video signals of one screen comprises the digital video signals of a single field.

5. The still picture recording apparatus according to claim 1, wherein the storing of the digital video signals into said still picture memory means and said delay memory means is achieved by using a vertical synchronizing signal contained in said input video signal.

6. The still picture recording apparatus according to claim 1, wherein said recording means records the digital video signals stored in said still picture memory means onto said recording medium, which is comprised of magnetic tape, using a digital audio tape system.

7. The still picture recording apparatus of claim 1, wherein the input video signals are NTSC video signals, the still picture recording apparatus is a digital audio tape system, and the predetermined duration of the pulse signal comprises a time required for recording one still picture plus a time equal to two field periods.

8. A still picture recording apparatus for selecting a desired screen out of continuously input video signals, storing the video signals of the screen as still picture data, and recording the still picture data onto a recording medium, comprising:
analog/digital converter means for converting the input video signals into digital video signals;
memory means, coupled to said analog/digital converter means, for storing the digital video signals as still picture data;
change detection means, coupled to said analog/digital converter means, for detecting a change in the digital video signals of sequential screens and for outputting a detection signal when the change in the digital video signals over plural screens of the continuously input video signals is greater than a predetermined value, said change detection means including timer means for generating a pulse signal of predetermined duration as said detection signal;
processing means, coupled to said memory means, for processing and recording the still picture data stored in said memory means onto the recording medium; and
timing means, coupled to said change detecting means, said analog/digital converter means, said memory means and said processing means, for controlling write-in timing of the digital video signals into said memory means and read-out timing of the still picture data from said memory means into said processing means, in accordance with receipt of said detection signal.

9. The still picture recording apparatus of claim 8, wherein the input video signals are NTSC video signals, the still picture recording apparatus is a digital audio tape system, and the predetermined duration of the pulse signal comprises a time required for recording one still picture plus a time equal to two field periods.

10. A method of recording still pictures comprising the steps of:
   (a) converting input video signals of a screen into digital video signals;
   (b) storing the digital video signals corresponding to the screen of input video signals in still picture memory means;
   (c) storing and delaying the digital video signals corresponding to the screen of input video signals in delay memory means;
   (d) detecting a change in the digital video signals of sequential screens of input video signals by comparing on a bit-by-bit basis the digital video signals of the screen of input video signals delayed in the delay memory means and the digital video signals of a subsequently converted screen of input video signals to generate a detection output signal representative of cumulative change therebetween;
   (e) comparing the detection output signal to a predetermined value to output a signal change detection signal of predetermined duration when the detection output signal is greater than the predetermined value, the signal change detection signal being indicative of a large detected change in the digital video signals of sequential screens; and
   (f) recording the digital video signals corresponding to the screen of input video signals stored in the still picture memory means onto a recording medium in response to generation of the signal change detection signal.

11. The method of recording still pictures of claim 10, wherein said step of detecting a change by comparing comprises the steps of:
   subtracting the corresponding bits of the digital video signals of the subsequently converted screen of input video signals and the digital video signals of the screen of input video signals delayed in the delay memory means to determine a bit by bit difference;
   determining an absolute value of each bit by bit difference; and
   accumulating the absolute values for every bit to generate the detection output signal.

12. The method of recording still pictures of claim 10, wherein said steps of storing in the still picture memory means and the delay memory means is synchronized with a vertical synchronization signal extracted from the input video signal.

13. The method of recording still pictures of claim 10, wherein said step of recording comprises recording the digital video signals on magnetic tape using a digital audio tape system.

14. The method of recording still pictures of claim 10, wherein the input video signals are NTSC video signals and the predetermined duration of the signal change detection signal comprises a time required to record one still picture plus a time equal to two field periods.

15. A method of selecting and recording still pictures of desired screens corresponding to continuously input video signals, comprising the steps of:
   converting the input video signals of a screen into digital video signals;
   storing the digital video signals as still picture data of at least one screen in memory means;
   detecting a change in the digital video signals of sequential screens to generate a change detection signal of predetermined duration when the change of the digital video signals of sequential screens is greater than a predetermined value;
   controlling, responsive to the change detection signal, writing of the digital video signals into the memory means from the digital/analog converter means and reading of the digital video signals out of the memory means; and
   recording the digital video signals read out from the memory means onto a recording medium as selected still pictures.

16. The method of selecting and recording of claim 15, wherein said step of recording comprises recording the digital video signals read out from the memory means onto a magnetic tape using a digital audio tape system.

17. The method of selecting and recording still pictures of claim 15, wherein the input video signals are NTSC video signals and the predetermined duration of the change detection signal comprises a time required to record one still picture plus a time equal to two field periods.

* * * * *